Aug. 30, 1927.
G. DE PETRIS
1,640,984
CONVERTIBLE AUTOMOBILE SEAT
Filed Sept. 17, 1926
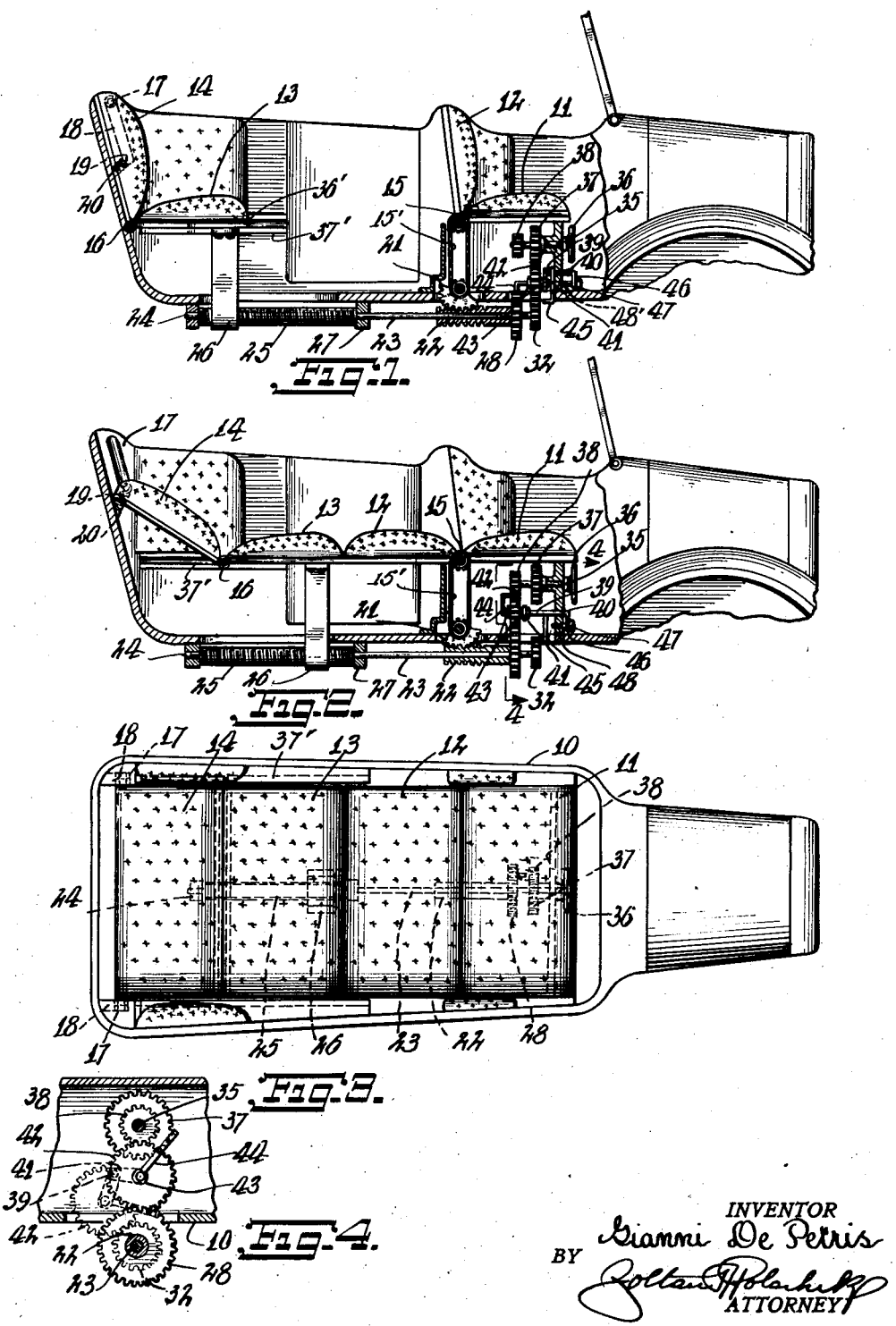
INVENTOR
Gianni De Petris
BY
ATTORNEY Patented Aug. 30, 1927.

1,640,984

UNITED STATES PATENT OFFICE.

GIANNI DE PETRIS, OF KEWANEE, ILLINOIS.

CONVERTIBLE AUTOMOBILE SEAT.

Application filed September 17, 1926. Serial No. 136,022.

This invention relates to improvements in automobiles, and more particularly to improvements in the seats thereof, allowing a ready transformation of said seats into a bed, and it is the principal object of the invention to provide the seats of an automobile with simple and conveniently operable means for lowering the back rests of the seats into a bed forming position, whereby the back rest of the rear seat assumes its position as a head rest.

Another object of the invention is the provision of an automobile having front and rear seats with means for normally holding the back rests in their upright or upwardly inclined position, while they allow a ready transformation into a bed.

A further object of the invention is the provision of cushioned seats of this type for a car, in which the back rests of the rear seats are traveling in a suitable groove of the automobile body if the seats are transformed into a bed and which are suitably cushioned to form a convenient head rest for a sleeper.

A still further object of the invention is the provision of a means for slidably guiding the rear seat during the transformation of the seats into a bed.

These and other objects and advantages of my invention will become more fully apparent as the description thereof proceeds, and will then be more specifically defined in the appended claims.

In the accompanying drawings forming a material part of this disclosure:

Fig. 1 is a side elevation of an automobile body having part of its chassis broken away to show the construction of the seats and their operating means, according to the present invention, with the seats in their normal position, and their back rests upright.

Fig. 2 is a view similar to Fig. 1, with the seats in the inclined position of the back rests to form a bed.

Fig. 3 is a top plan view thereof.

Fig. 4 is a fragmentary view taken on the line 4—4 of Figure 2.

An automobile body 10 of any ordinary, well known construction and type, has a front seat 11 with back rest 12 supported therein in the ordinary manner suitably cushioned, and a rear seat 13 having a back rest 14.

The back rests 12 and 14 are hinged at their lower ends, as at 15 and 16, to the inner ends of the seats 11 and 13 respectively. The upper end of the back rest for the rear seat has a transverse bar 17 formed therewith, the ends of which slide and are guided in grooves 18 formed in the side walls of the chassis, and a spring cushioned block 19 and 20 cushions the back rest in its inclined position when acting as a head rest for a sleeper.

The hinge 15 of the front seat is connected by a chain 15' with a toothed segment 21 adapted to engage a hollow rack bar 22 in which a rod 23 is rotatively arranged having its rear end supported in a bearing 24 of the rear wall of the chassis, and said bar 23 is formed intermediate its ends with a thread or worm 25 passing through a hanger 26 secured to the underside of the rear seat and provided with an inner thread with which said thread 25 engages, while a support 27 supports the bar or rod 23, intermediate the ends thereof.

The rack 22 carries at its front end a gear 28, and the shaft 23 extends through and beyond gear 28, and carries a gear 32. A stub shaft 35 is rotatively supported in the chassis, and carries at its outer end a hand wheel 36, while on the inner end gears 37, 38 are fixed. A crank member 39, is pivotally and slidably mounted, as at 40, in the chassis, and is formed on the inner end with a crank portion 41, rotatively supporting an idler gear 42 between collars 43. The inner end portion 44 of the crank member 39, projects perpendicularly to crank portion 41, and a side arm 45 also projects perpendicularly to the crank member 39. The outer end 46 of crank member 39 also projects perpendicularly to the crank member 39, and has a pin 47 slidable therethrough and engageable in apertures 48 in the chassis. Normally idler gear 42 meshes with gears 38 and 28, therefore upon the turning of hand wheel 36, gear 28 is operated to lower back 12. The idler gear is locked in this engaged position by pin 47 engaging a certain positioned aperture 48, and at the same time side arm 45 engages against gear 32 locking this gear, clearly shown in Figure 2.

The pin 47 and the crank member 39 may be pulled outwardly, the crank member 39 then turned through a certain angle so that gear 42 engages gears 37 and 32. The pin may then be slipped inwards into another aperture 48 locking the parts in this position. The inner end portion 44 now engages against gear 28, locking the same. Upon rotating handle 36, the gear 32 turns, causing 13 to slide forward, and 14 to be inclined.

The rear seat 13 has lower lateral flanges 36 formed therewith by means of which it is slidably guided in guide grooves 37 when the rests are transformed into a bed.

The operation of the device will be clear from the above description without further explanation, the proper operation of the hand wheel 36 will lower back rest 12 and draw rear seat 13 forward to engage with the back rest 12 while the back rest 14 will slide down to assume an inclined position as head rest for a sleeper.

It will be understood that while I have shown the preferred form of my device as an example, the same is capable of many changes in its construction, such as fall within the scope of the appended claims without departure from the spirit of the invention.

Having thus described my invention, what I claim as new, and desire to secure by United States Letters Patent is:

1. In a device of the class described, having a hollow rack bar with a gear on one end, said rack bar being operatively connected to lower the back of a chassis front seat, and a shaft with a gear extending through said rack bar gear, said shaft being operatively connected to move the rear seat, and incline the back of said rear seat of a chassis, the combination of a stub shaft rotatively mounted in said chassis, a hand wheel on the outer end of said shaft, two gears on the inner end of said shaft, a crank member rotatively and slidably mounted in said chassis, a crank portion formed on the inner end of said crank member, an idler gear rotatively mounted on said crank portion, a pair of collars on each side of said gear, an inner end portion depending perpendicularly from said crank member, a side arm depending perpendicularly from said crank member, an outer end portion depending perpendicularly from said crank member, a pin slidable through said outer end portion engageable in apertures in said chassis, said idler gear normally meshing with one of said gears on said stub shaft and with the said gear on said hollow rack bar, and said side arm normally locking said gear on the shaft which extends through the hollow rack bar.

2. In a device of the class described, having a hollow rack bar with a gear on one end, said rack bar being operatively connected to lower the back of a chassis front seat, and a shaft with a gear extending through said rack bar gear, said shaft being operatively connected to move the rear seat, and incline the back of said rear seat of a chassis, the combination of a stub shaft rotatively mounted in said chassis, a hand wheel on the outer end of said shaft, two gears on the inner end of said shaft, a crank member rotatively and slidably mounted in said chassis, a crank portion formed on the inner end of said crank member, an idler gear rotatively mounted on said crank portion, an inner end portion depending perpendicularly from said crank member, a side arm depending perpendicularly from said crank member, an outer end portion depending perpendicularly from said crank member, a pin slidable through said outer end portion engageable in apertures in said chassis, said idler gear normally meshing with one of said gears on said stub shaft and with the said gear on said hollow rack bar, and said side arm normally locking said gear on the shaft which extends through the hollow rack bar.

3. In a device of the class described, having a hollow rack bar with a gear on one end, said rack bar being operatively connected to lower the back of a chassis front seat, and a shaft with a gear extending through said rack bar gear, said shaft being operatively connected to move the rear seat, and incline the back of said rear seat of a chassis, the combination of a stub shaft rotatively mounted in said chassis, two gears on the inner end of said shaft, a crank member rotatively and slidably mounted in said chassis, a crank portion formed on the inner end of said crank member, an idler gear rotatively mounted on said crank portion, a pair of collars on each side of said gear, an inner end portion depending perpendicularly from said crank member, a side arm depending perpendicularly from said crank member, an outer end portion depending perpendicularly from said crank member, a pin slidable through said outer end portion engageable in apertures in said chassis, said idler gear normally meshing with one of said gears on said stub shaft and with the said gear on said hollow rack bar, and said side arm normally locking said gear on the shaft which extends through the hollow rack bar.

In testimony whereof I have affixed my signature.

GIANNI DE PETRIS.